United States Patent [19]

Hughes

[11] 4,432,086
[45] Feb. 14, 1984

[54] TURNTABLE APPARATUS FOR VIDEO DISC PLAYER

[75] Inventor: Larry M. Hughes, Indianapolis, Ind.

[73] Assignee: RCA Corporation, New York, N.Y.

[21] Appl. No.: 374,372

[22] Filed: May 3, 1982

[51] Int. Cl.³ .................. G11B 17/04; G11B 25/04; G11B 23/02

[52] U.S. Cl. .................. 369/269; 346/137; 360/86; 369/270

[58] Field of Search ........... 369/270, 271, 292, 269, 369/282, 290, 261; 360/86, 99; 346/137

[56] References Cited

U.S. PATENT DOCUMENTS

| 3,871,663 | 3/1975 | Stave | 274/10 S |
|---|---|---|---|
| 3,970,317 | 7/1976 | Kirschner | 274/105 |
| 4,068,271 | 1/1978 | Kok | 346/137 |
| 4,328,575 | 5/1982 | Elliott | 369/269 |
| 4,347,599 | 8/1982 | Vitale | 369/270 |
| 4,390,979 | 1/1983 | Saito et al. | 369/270 |

OTHER PUBLICATIONS

U.S. patent application Ser. No. 148,467, of Charles A. Elliott.

Primary Examiner—Steven L. Stephan
Attorney, Agent, or Firm—E. M. Whitacre; J. S. Tripoli; D. A. Kulkarni

[57] ABSTRACT

A turntable secured to a bearing member is freely rotatable about a support post. The bearing member has radial slots through which the fingers of a segmented spindle protrude. The spindle is axially slidable on the post. A spring is disposed about the post for urging the spindle upward for engagement with the record center hole as a record is placed on the turntable.

6 Claims, 5 Drawing Figures

TURNTABLE APPARATUS FOR VIDEO DISC PLAYER

This invention generally relates to a disc record player and, more particularly, it pertains to a compact turntable/spindle assembly for use in a video disc player.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver. A capacitance-type system is illustratively disclosed in U.S. Pat. No. 3,842,194 (Clemens).

In such systems, the turntable is fitted with a spindle which engages the center hole of a record as it is placed on the turntable to center the record with respect to the turntable. It is, however, difficult to ensure a positive engagement between the record center hole and the turntable spindle due to a myriad of problems (such as, warp, dimensional variations, etc.). Any eccentricity in the location of the record on the turntable can cause undesirable cyclical deviations in the recovered signals.

To this end, the turntable might be provided with a spring-loaded spindle in the manner shown in U.S. Patent application, Ser. No. 148,467, of Elliott. The spindle is biased upward to effect engagement between it and the record center hole as a record is passed along the spindle for placement on the turntable to assure the desired centering of the record.

As shown in Elliott, the turntable/spindle assembly is fixedly disposed on a shaft which is journaled for rotation about a set of bearings located underneath the turntable. Although such a configuration of the turntable/spindle assembly works quite well, it takes up a good deal of top to bottom space. This provides one limitation on the degree to which the overall height of the video disc player can be reduced.

The turntable/spindle assembly in accordance with this invention, not only provides a positive engagement between the record center hole and the centering spindle, but also permits the design of a compact player. A bearing member having at least two radially extending slots is rotatably mounted on a stationary support post. The turntable is suspended from the bearing member for rotation therewith. A segmented spindle having at least two radially extending fingers is rotatably and slidably disposed on the post such that the radial fingers protrude from the slots in the bearing member. A coil spring biases the spindle upward to effect engagement between the peripheral surfaces of the protruding fingers and the record center hole as a record is placed on the turntable to align the record with the turntable.

Figure 1:
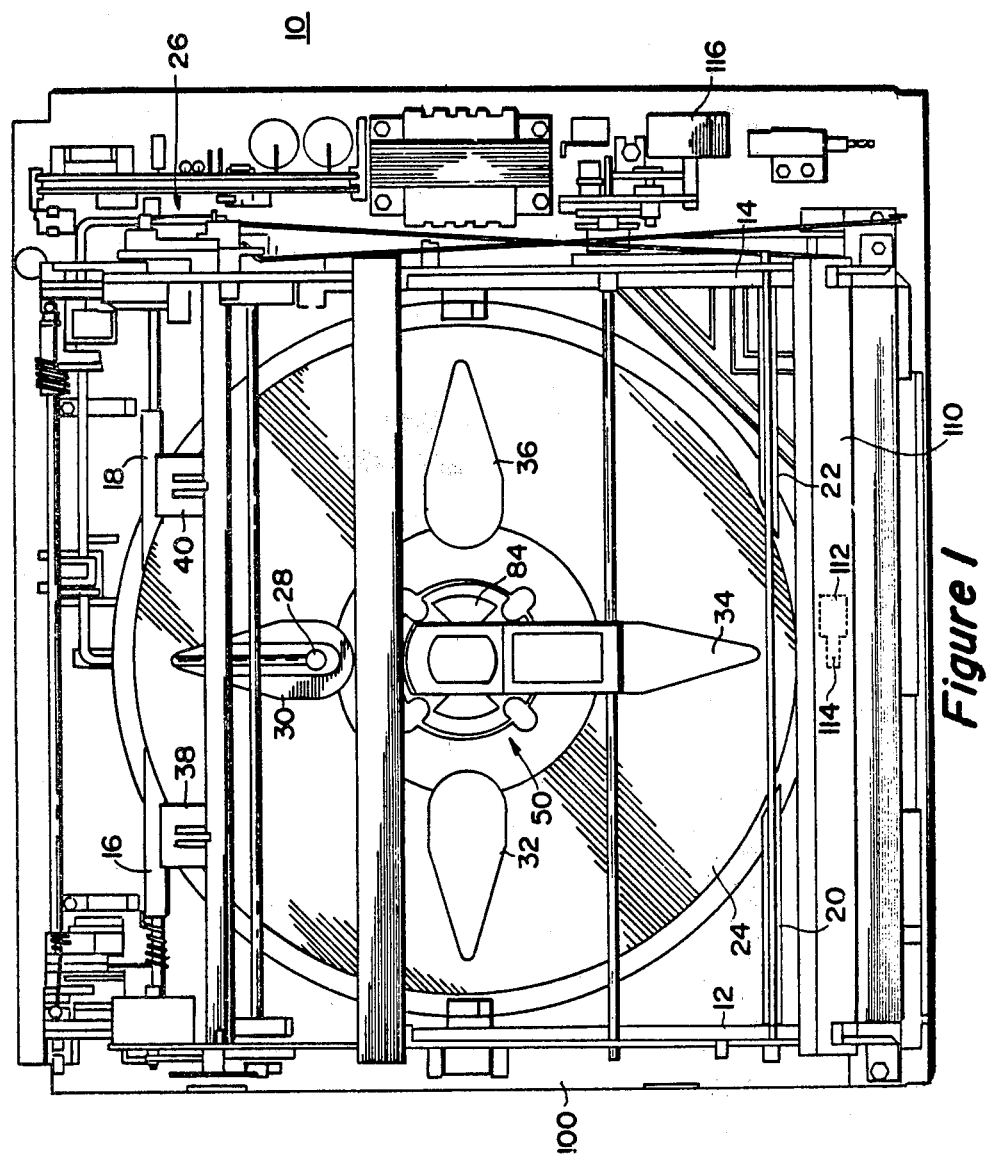
FIG. 1 shows a video disc player embodying a novel turntable/spindle assembly pursuant to the subject invention.
Figure 2:
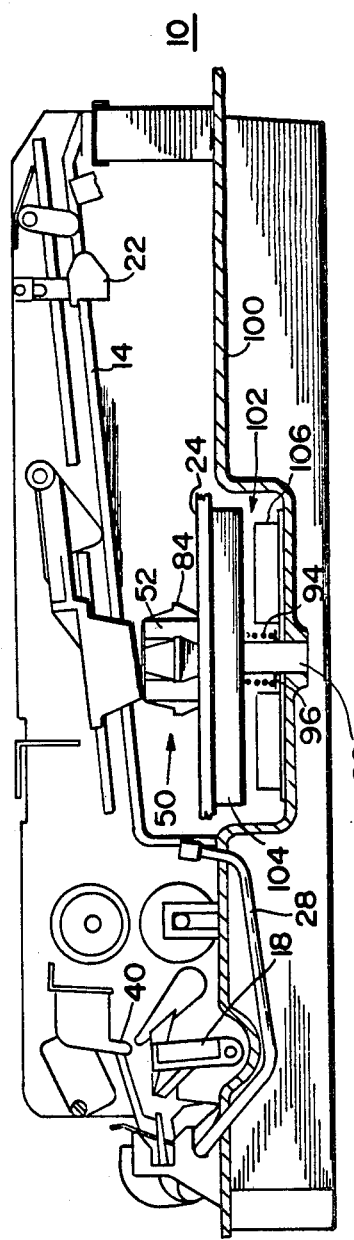
FIG. 2 illustrates an end view of the video disc player of FIG. 1 incorporating the present turntable/spindle assembly.

To load a video disc into the player 10, shown in FIGS. 1 and 2, a video disc caddy (e.g., of the type illustrated in U.S. Pat. No. 4,266,784) is inserted along a pair of guide tracks 12 and 14. After the caddy is fully inserted into the player, the caddy jacket is extracted to leave the record inside the player resting on a set of record receiving pads 16, 18, 20 and 22. The record is then lowered onto a rotatable turntable 24 by a disc handling mechanism 26 in the manner described below.

A record lifting finger 28 is raised through one of the slots 30, 32, 34 and 36 in the turntable 24 to lift a record, resting on the receiving pads 16, 18, 20 and 22, to a position against the stops 38 and 40. In the raised position, the record is disposed above the receiving pads 16, 18, 20 and 22. The receiving pads 16, 18, 20 and 22 are then retracted out of the way, and the lifting finger 28 is lowered to gently deposit the record on the turntable 24. The lifting finger 28 is subsequently lowered to a position beneath the turntable 24 to free the turntable for rotation.

Figure 3:
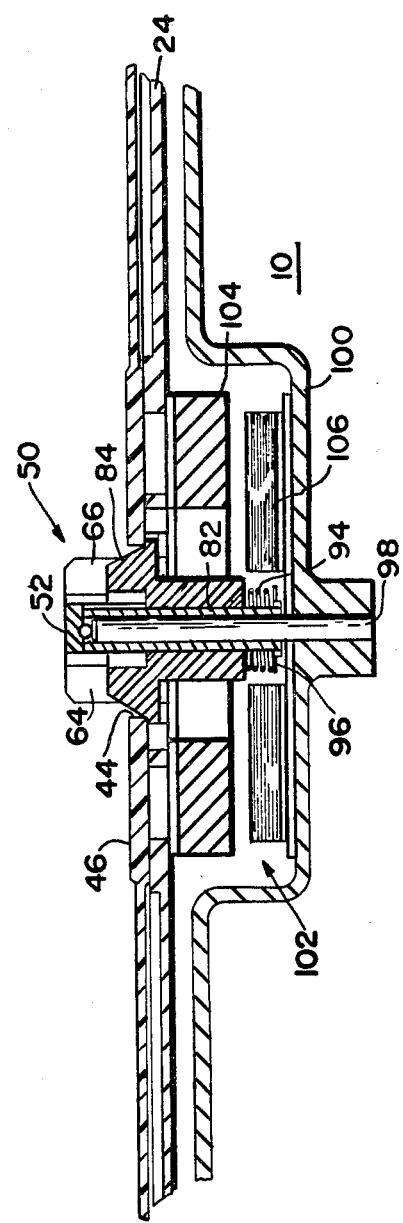
FIG. 3 is a cross-sectional view of the instant turntable/spindle assembly.
Figure 4:
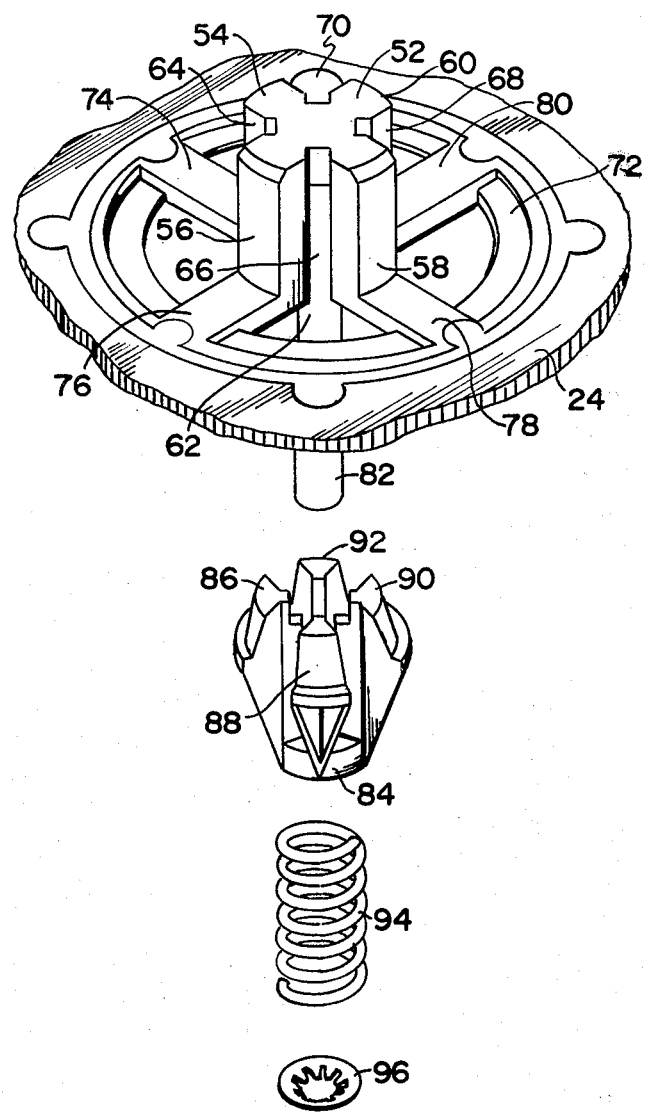
FIG. 4 depicts an exploded perspective view of the subject turntable/spindle assembly.

The turntable/spindle apparatus 50, in accordance with this invention, will now be described in conjunction with FIGS. 3 and 4. The subject apparatus 50 includes a hollow bearing member 52 having two sets of oppositely-disposed ribs 54, 58 and 56, 60. The ribs 54, 58 and 56, 60 form a central cylindrical cavity 62 communicating with four symmetrically-arranged slots 64, 66, 68 and 70 in the bearing member.

An annular rim portion 72 of the bearing member 52 joins together the offset leg portions 74, 76, 78 and 80 of the ribs 54, 56, 58 and 60. The turntable 24 is fixedly attached to the rib 72 of the bearing member 52 for rotation therewith.

Arranged inside the cylindrical cavity 62, and secured fixedly to the ribs 54, 56, 58 and 60, is a brass sleeve 82. A segmented spindle 84 having four radially extending fingers 86, 88, 90 and 92 is slidably disposed about the sleeve 82 such that the radial fingers protrude through the slots 64, 66, 68 and 70 in the manner shown in FIGS. 2 and 3. The external surfaces of the protruding fingers 86, 88, 90 and 92 define a frusto-conical surface, which is dimensioned for engagement with the inner walls of the record center hole. A coil spring 94 is arranged between a retaining washer 96 secured to the sleeve 82 and the spindle 84 to urge the spindle upward to assure the desired engagement between the protruding fingers 86, 88, 90 and 92 and the center hole 44 of a record 46, when the record is passed along the spindle for placement on the turntable 24, as can be seen in FIG. 3.

The turntable/spindle assembly 50 is rotatably disposed about a support post 98 fixedly mounted to the housing 100 of the player. A motor 102 drives the turntable during playback. The turntable motor 102 comprises an annular magnetic ring 104 attached to the underside of the turntable 24 and a set of field windings 106 located beneath the magnetic ring.

The player has a carriage 110 which houses a pickup cartridge 112. A stylus 114, contained in the cartridge 112, is lowered on a turntable-supported record to recover signals. A motor 116 drives the carriage 110 toward the turntable spindle 84 so that it follows the inward motion of the stylus 114. The signals at the output of the stylus 114 are processed and fed to a conventional television receiver.

To retrieve a turntable-supported record, the turntable 24 is stopped at a predetermined angular position such that one of four slots 30, 32, 34 and 36 in the turntable overlies the record lifting finger 28. The lifting finger 28 is then raised to lift the record to a position above the record receiving pads 16, 18, 20 and 22. The receiving pads 16, 18, 20 and 22 are returned to their normal position, and the lifting finger 28 is then retracted to lower the record on the receiving pads. An empty jacket is inserted into the player to recapture the record.

Figure 5:
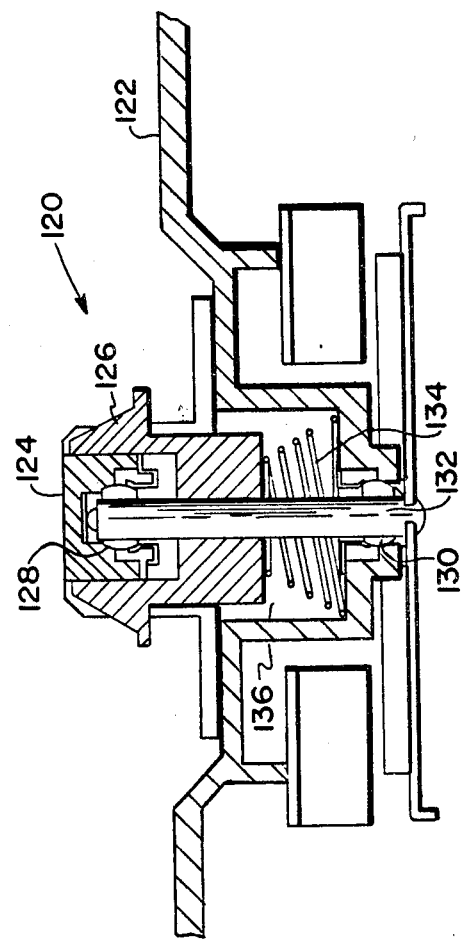
FIG. 5 represents another embodiment of a turntable/spindle assembly in accordance with this invention.

FIG. 5 illustrates a further embodiment 120 of the present invention. A turntable 122 is attached to an upper bearing housing 124 for rotation therewith. The upper bearing housing 124 has four symmetrically-disposed slots through which the radially protruding fingers of a segmented spindle 126 extend. Bearing elements 128 and 130 are respectively secured to the upper bearing housing 124 and the turntable 122. The turntable/spindle assembly is freely rotatable about a support post 132 fixedly mounted in the player. The spindle 128 is axially displaceable on the post 134. A coil spring 134 is disposed in the turntable recess 136 to urge the spindle 128 upward.

The operation of the FIG. 5 apparatus is similar to the operation of the first embodiment. As a record is passed along the spindle 128 for placement on the turntable 122, the extending fingers of the spindle engage the record center hole to achieve the desired centering of the record on the turntable 122. An advantage of the FIG. 5 embodiment is that all the moving parts are referenced to the external surface of the stationary post 132.

The reduction in the height of the turntable/spindle assembly is achieved because both the record centering spindle and the turntable support bearings share the same physical space.

What is claimed is:

1. Apparatus for centering a centrally-apertured disc record on a rotatable turntable comprising:
   (A) a stationary post;
   (B) a bearing member having at least two radially extending slots communicating with the peripheral surfaces thereof; said bearing member being rotatably mounted on said post; said turntable being suspended from said bearing member for rotation therewith;
   (C) a segmented spindle having at least two radially extending fingers; said segmented spindle being slidably disposed about said post such that said fingers extend outwardly from said slots in said bearing member; and
   (D) means for biasing said spindle away from said turntable to effect engagement between the peripheral surfaces of said protruding fingers and the inner walls of the record center hole as a record is passed along said spindle for placement on said turntable.

2. The apparatus as defined in claim 1 wherein the exterior surfaces of said protruding fingers define a frusto-conical surface.

3. The apparatus as defined in claim 1 wherein said biasing means comprises a coil spring disposed about said post.

4. The apparatus as defined in claim 1 for use with a turntable having a recessed central region with a central opening through which said post extends; said apparatus further including a second bearing member arranged between the inner walls of said turntable central opening and said post.

5. The apparatus as defined in claim 1 wherein said bearing member has four symmetrically-disposed slots.

6. The apparatus as defined in claim 5 wherein said spindle has four symmetrically-arranged fingers which protrude through said slots in said bearing member.

* * * * *